United States Patent [19]
Patrick

[11] Patent Number: 6,131,055
[45] Date of Patent: Oct. 10, 2000

[54] AIRCRAFT NON-NORMALIZED ANGLE-OF-ATTACK INDICATING SYSTEM

[75] Inventor: Nicholas J. M. Patrick, Houston, Tex.

[73] Assignee: The Boeing Company, Seattle, Wash.

[21] Appl. No.: 09/209,348

[22] Filed: Dec. 11, 1998

[51] Int. Cl.[7] .................................................. G01C 21/00
[52] U.S. Cl. .................................. 701/6; 701/14; 340/974
[58] Field of Search .......................... 701/6, 14; 340/973, 340/974, 976; 73/179, 180

[56] References Cited

U.S. PATENT DOCUMENTS

| | | | |
|---|---|---|---|
| 2,237,306 | 4/1941 | Hood | 73/180 |
| 2,352,955 | 7/1944 | Johnson | 73/180 |
| 2,499,284 | 2/1950 | Smith | 116/117 |
| 2,941,400 | 6/1960 | Nesbitt | 73/178 |
| 2,986,033 | 5/1961 | Spencer | 73/180 |
| 3,587,311 | 6/1971 | Hays, Jr. | 73/180 |
| 3,614,036 | 10/1971 | Foster | 244/77 |
| 3,654,443 | 4/1972 | Dendy et al. | 235/150.2 |
| 3,654,806 | 4/1972 | Bateman | 73/178 |
| 3,686,626 | 8/1972 | Bateman et al. | 340/27 |
| 3,686,936 | 8/1972 | Daudt, Jr. | 73/180 |
| 3,814,912 | 6/1974 | Manke et al. | 235/150.2 |
| 3,970,829 | 7/1976 | Melvin | 235/150.22 |
| 4,027,533 | 6/1977 | Pretto | 73/188 |
| 4,040,005 | 8/1977 | Melvin | 340/27 |
| 4,044,975 | 8/1977 | Blechen et al. | 244/181 |
| 4,230,290 | 10/1980 | Townsend et al. | 244/1 |
| 4,235,104 | 11/1980 | Hoadley et al. | 73/180 |
| 4,247,843 | 1/1981 | Miller et al. | 340/27 |
| 4,390,950 | 6/1983 | Muller | 364/434 |
| 4,468,961 | 9/1984 | Berg | 73/180 |
| 4,583,094 | 4/1986 | Mosier | 340/975 |
| 4,903,017 | 2/1990 | Wooller | 340/975 |
| 4,908,619 | 3/1990 | Bala et al. | 340/966 |
| 4,909,077 | 3/1990 | Greene | 73/180 |
| 4,910,513 | 3/1990 | Kelly et al. | 340/966 |
| 5,003,305 | 3/1991 | Kelly et al. | 340/974 |
| 5,016,177 | 5/1991 | Lambregts | 364/428 |
| 5,089,968 | 2/1992 | Orgun et al. | 364/435 |

*Primary Examiner*—Michael J. Zanelli
*Attorney, Agent, or Firm*—James P. Hamley

[57] ABSTRACT

The present invention is directed to a non-normalized aircraft angle-of-attack indicating system. An angle-of-attack vane produces a signal $\alpha'$ indicative of raw aircraft angle-of-attack. A pitot-static system (68) produces output signals representative of aircraft static pressure and total pressure, $P_s$ and $P_t$, respectively. The signals $\alpha'$, $P_s$ and $P_t$ are fed to an air data computer (66) which correspondingly produces an aircraft actual angle-of-attack value $\alpha$ and a calculated Mach number, M. Configuration sensors (80) produce output signals representative of gear position, g, flap position, f, and speed brake position, sb. The signals $\alpha$, M, g, f and sb are fed to a display computer (76). The display computer includes a submodule (90) which utilizes a lookup table to determine a value of angle-of-attack stick shaker, $\alpha_{ss}$ from the values of M, g, f and sb. A second submodule (92) utilizes a lookup table to produce a second angle-of-attack reference value $\alpha_{ref}$ from the values g, f and sb. The display computer (76) feeds the $\alpha$, $\alpha_{ss}$, $\alpha_{ref}$ signals to an angle-of-attack indicator which includes a pointer (102) which is moveable with respect to a fixed gauge (104). The $\alpha$ signal is used to drive the pointer (102) to indicate the aircraft's actual angle-of-attack. Bug drivers are utilized to position the first bug $\alpha_{ss}$ and the second bug, $\alpha_{ref}$, at their appropriate positions on the opposite side of the gauge.

16 Claims, 4 Drawing Sheets

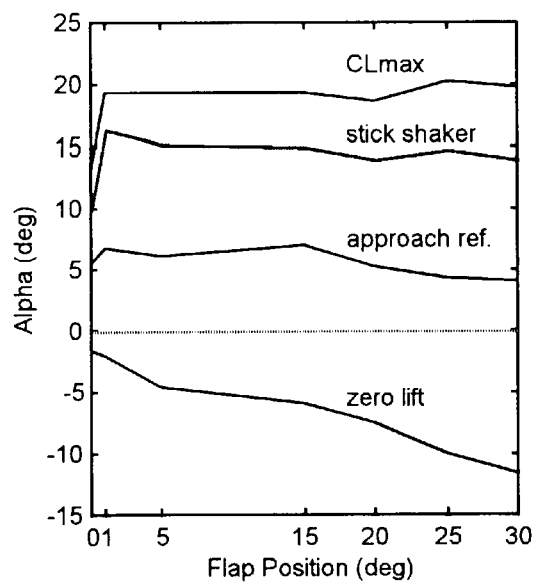
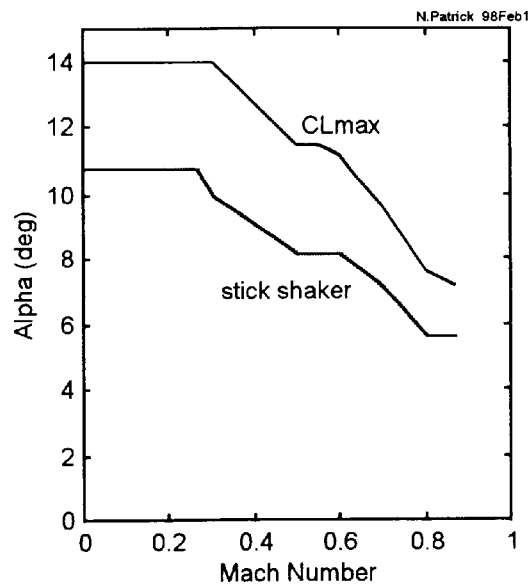
Fig. 1a
Fig. 1b
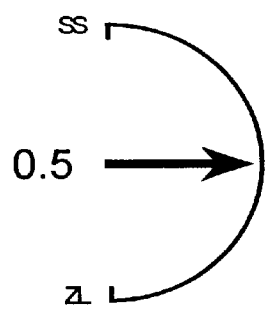
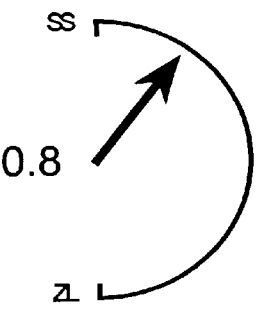
Fig. 2a
Fig. 2b
*Prior Art*

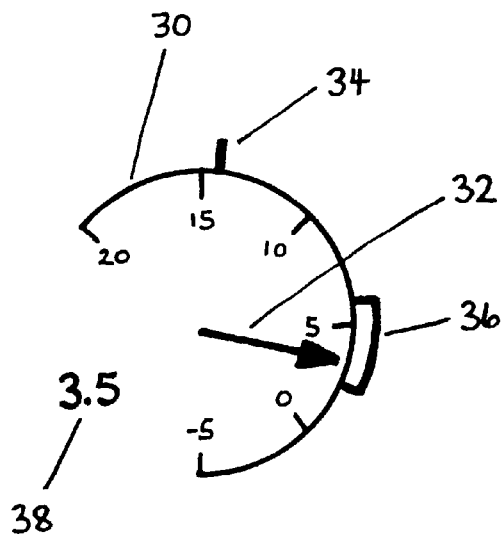
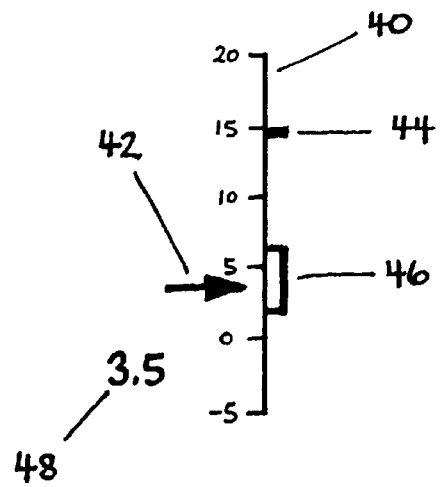
*Fig. 3a*
*Fig. 3b*
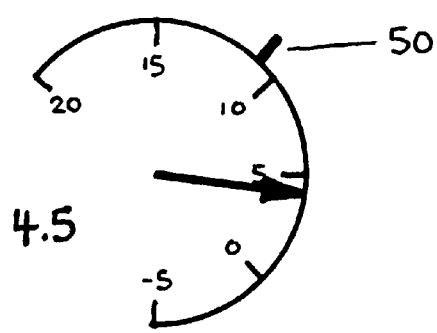
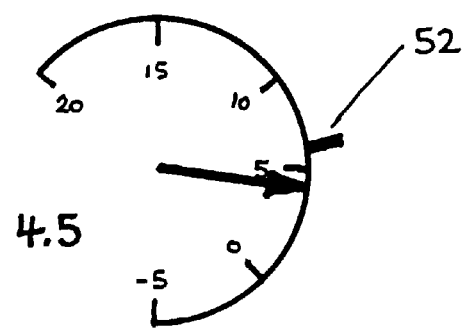
*Fig. 4a*
*Fig. 4b*

AIRCRAFT NON-NORMALIZED ANGLE-OF-ATTACK INDICATING SYSTEM

BACKGROUND OF THE INVENTION

The present invention relates to the aircraft indicator art and, in particular to a non-normalized angle-of-attack indicating system.

Angle-of-attack refers to the angle between an aircraft's wing and the oncoming air. For maneuvering flight, or for flight without reference to air speed, angle-of-attack is an extremely useful measure of the aerodynamic state of an aircraft's wing.

FIG. 1a depicts angles of attack for a typical commercial transport corresponding to the following states of the wing, states which are of particular interest to the pilot:

$C_{Lmax}$, (the maximum lift coefficient developed by the wing); stick-shaker (the predetermined angle-of-attack at which the cockpit stick-shaker is activated to discourage the flight crew from approaching a stall); approach reference (the angle-of-attack to be flown during the approach); and zero lift (the angle-of-attack at which the aircraft's wing develops zero lift). Note that the values vary significantly with changes in aircraft configuration such as flap position.

Figure 1b depicts the relationship between two of the aforementioned angles of attack and Mach number. Notice that there is a significant variation in these angles over the range of Mach numbers experienced by a typical commercial transport aircraft.

Prior to the present invention, angle-of-attack information has been displayed using a so-called normalized display, in which two key angles of attack (for example, stick-shaker and zero lift) are used as anchor points on the scale. For example, stick-shaker angle-of-attack ($\alpha_{ss}$) might be shown at the 12o'clock position on the display and zero-lift angle-of-attack ($\alpha_{zl}$) at the 6o'clock position as shown in FIG. 2a. Then, the angle at which to display the pointer, b (measured in degrees, counterclockwise from the 6 o'clock position) would be:

$$b = \frac{\alpha - \alpha_{zl}}{\alpha_{ss} - \alpha_{zl}} \times 180° \quad \text{[Equation 1]}$$

Using Equation 1, an angle-of-attack halfway between $\alpha_{ss}$ and $\alpha_{zl}$ would be shown at 90°, i.e. at the 3o'clock position.

The above-described method of depicting angle-of-attack has a drawback. As can be seen from FIG. 1b, for some aircraft the angle-of-attack at stick shaker varies significantly with Mach number. For the aircraft as shown, it drops from 11° angle-of-attack at low Mach to about 6° angle-of-attack at Mach numbers typical of cruising flight. If the air data measurement is corrupted for some reason (perhaps by a sensor or avionics failure) such that Mach number is estimated incorrectly, then $\alpha_{ss}$ and $\alpha_{zl}$ will be incorrectly estimated, and the scaling defined by Equation 1 will change the needle angle, causing the indicator to be misleading.

For example, consider the aircraft of FIGS. 1a and 1b flying at a low Mach number ($\alpha_{ss}=11°$ angle-of-attack, $\alpha_{zl}=-2°$ angle-of-attack) and at 4.5° angle-of-attack. According to Equation 1, the pointer should be displayed at the 3o'clock position (i.e. the midpoint of the scale, or 90° towards "SS" from "ZL") as shown in FIG. 2a. However, if the Mach number is erroneously computed to be in the cruise range (say Mach 0.75) then using Equation 1 with $\alpha_{ss}=6°$ angle-of-attack produces an incorrect pointer angle of 145° as shown in FIG. 2b. This is clearly not a desirable state of affairs during such an air data failure, when the angle-of-attack indicator in needed the most.

The same argument above applies to any re-scaling of the display based on aircraft configuration parameters such as flap position, which would further render the traditional normalized display useless if configuration sensing were inoperative or erroneous.

BRIEF SUMMARY OF THE INVENTION

It is an object of the present invention, therefore, to provide an improved aircraft angle-of-attack display system which does not exhibit the problems known to prior art displays.

Briefly, according to the invention, an aircraft non-normalized angle-of-attack indicator comprises a gauge having fixed position markings to indicate a predetermined range of aircraft angle-of-attack. A pointer is predeterminedly positioned with respect to the gauge for indicating angle-of-attack. A pointer driver determines the aircraft's actual angle-of-attack and positions the pointer in response thereto. A first bug is moveable with respect to the gauge markings to define a first limit condition for aircraft angle-of-attack. A bug driver determines the aircraft's first limit position and positions the first bug in response thereto.

In a further aspect of the invention, a second bug is moveable with respect to the gauge markings to define a reference condition for aircraft angle-of-attack, A bug driver includes means for determining the reference position and positions the second bug in response thereto.

In yet a further aspect of the invention, the pointer driver includes means for sensing rate of change in aircraft angle-of-attack and quickening the position of the pointer or bugs in response thereto.

BRIEF DESCRIPTION OF THE DRAWINGS

FIG. 1a is a graph depicting key angles of attack versus flap position for a typical transport aircraft;

Figure 1b is a graph of angle-of-attack versus Mach number and depicts variations in angles of attack at maximum lift and stick shaker;

FIG. 2a is a prior art normalized display showing 4.5° angle-of-attack normalized between the appropriate values for zero-lift and stick shaker of −2° angle-of-attack and 11° angle-of-attack, respectively;

FIG. 2b is the same display as set forth in FIG. 2a with a value of 4.5° angle-of-attack and an erroneous high Mach stick-shaker value of 6° angle-of-attack;

FIG. 3a depicts a first implementation of the inventive non-normalized, angle-of-attack indicator utilizing a round dial with a moving pointer and moveable bugs;

FIG. 3b depicts an alternate, linear implementation of the angle-of-attack indicator of the inventive angle-of-attack indicator;

FIG. 4a depicts the inventive angle-of-attack indicator and shows the aircraft at an angle-of-attack of 4.5° with the upper limit angle-of-attack bug being shown in the low Mach number position typical of low altitude flight.

FIG. 4b depicts the inventive angle-of-attack indicator showing the aircraft at an angle-of-attack of 4.5°, with an upper limit bug shown in the high Mach number position typical of cruising flight, but also possible if Mach number is erroneously measured during low-altitude flight;

DETAILED DESCRIPTION OF THE INVENTION

Figure 5:
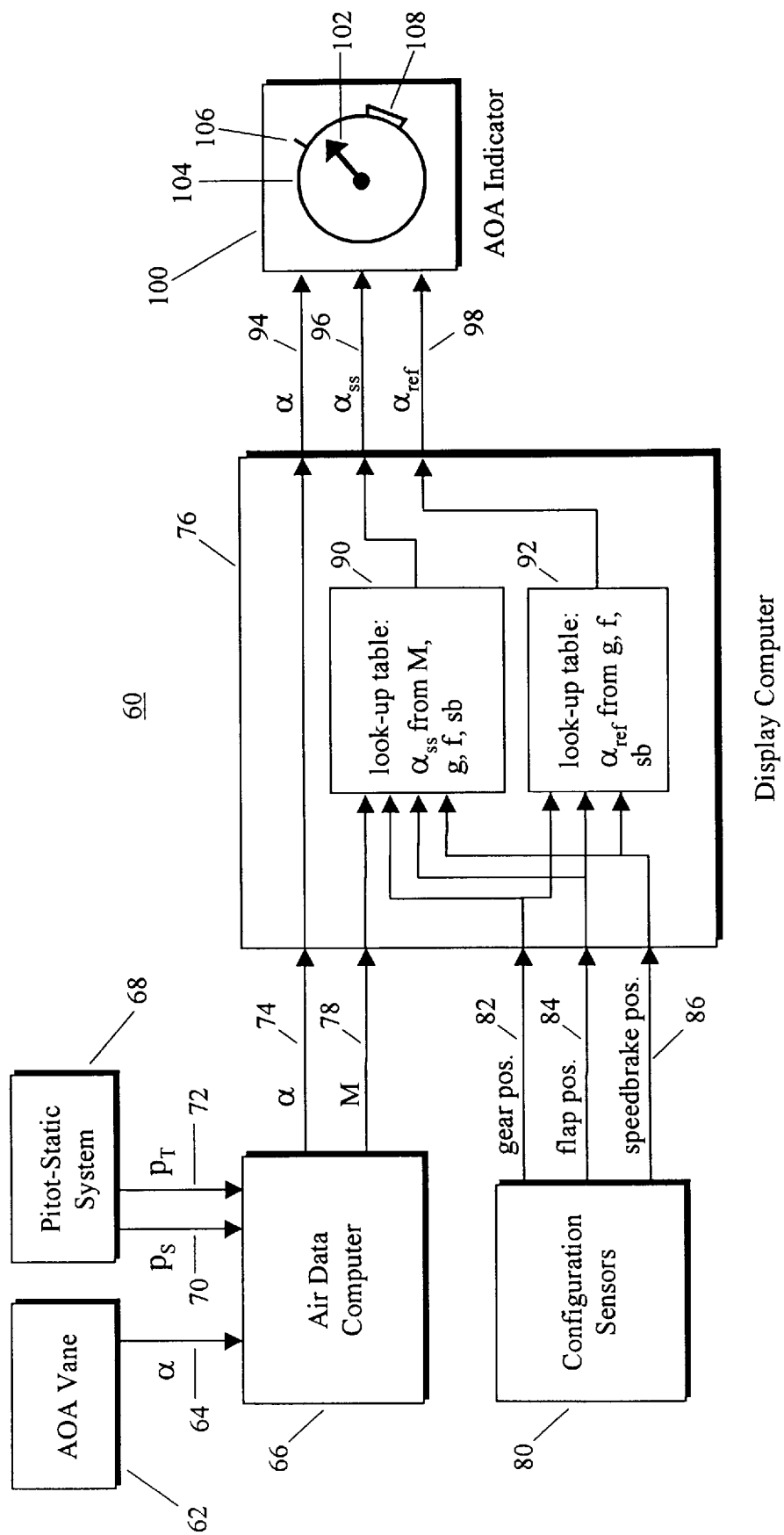
FIG. 5 is a schematic diagram illustrating the primary components of the non-normalized angle-of-attack indicating system.

Knowledge of angle-of-attack is useful in flight, for detection of abnormal flight conditions (including air data measurement failures), and to provide an aircraft's flight crew with general situational awareness about the state of the aircraft's wing.

Many of the critical angles of attack that the flight crew may use, such as the angle-of-attack at stall, are influenced heavily by such measured parameters as Mach number. Traditional angle-of-attack displays have dealt with this influence by rescaling the pointer's movement against the dial or gauge so that the limiting angle-of-attack always remains at the top of the indicator, and another reference angle-of-attack always remains in the middle or at the bottom of the indicator. However, when the factors that influence these "key" values of angle-of-attack are in error (perhaps because of a sensing or computation failure), the scaling of the entire display is inappropriate, and is often misleading.

The proposed non-normalized angle-of-attack indicating system circumvents this problem by fixing the scale on which angle-of-attack is displayed, and instead moving the bugs for the key values of angle-of-attack as their influencing parameters change. This scheme makes the proposed indicator much more reliable in cases where the estimated values of the influencing parameters may be in error, without appreciably compromising each utility in normal operations.

The proposed non-normalized angle-of-attack indicating system consists of an angle-of-attack indicator in which the pointer, or needle movement is not scaled between salient values such as zero-lift or approach angle-of-attack and stick shaker angle-of-attack.

Instead, angle-of-attack is presented against a fixed scale, or gauge marking degrees of angle-of-attack (or alternatively marked in some other unit of angle-of-attack) while the "bugs" for the salient values (e.g., stick shaker, approach reference and so forth) are shifted as the various influencing factors, which include Mach number, flap position and so forth, vary.

FIGS. 3a and 3b depict two implementations of the inventive angle-of-attack indicator.

Referring to FIG. 3a, shown is a fixed gauge or scale 30 which is arcuate in shape extending from an indicated −5° angle-of-attack at 6o'clock, around to a +20° angle-of-attack at 10:30o'clock. At equal arc spacings, are ticks which indicate angles of attack, within the stated range, in 5° increments.

A moving needle or pointer 32 arcuately moves on one side of the gauge 30 in a manner to indicate the aircraft's measured angle-of-attack. Actuation of the pointer is more clearly understood with reference to FIGS. 5 and 6.

On the opposite side of the gauge 30 from the pointer 32 are bugs 34, 36. The bugs 34, 36 are moveably positionable with respect to the gauge 30. The first bug 34 is moveable to indicate a first limit condition, such as stick shaker.

The second bug 36 is moveable with respect to the gauge 30 to indicate a reference condition, such as the reference angle-of-attack to be flown during an approach. Note that the second bug 36 is shown as indicating a range of angle-of-attack values, because there is more than one acceptable value of angle-of-attack for the approach condition.

Also depicted in the display system of FIG. 3a is a digital readout of aircraft actual angle-of-attack at 38.

FIG. 3b illustrates an alternate implementation of the inventive non-normalized, aircraft angle-of-attack indicator. Shown is a gauge 40 comprised of a linear scale extending from a low value of −5° angle-of-attack to a high value of 20° angle-of-attack. Equidistantly spaced along the gauge 40 are tick marks at every five degrees of aircraft angle-of-attack.

Figure 6:
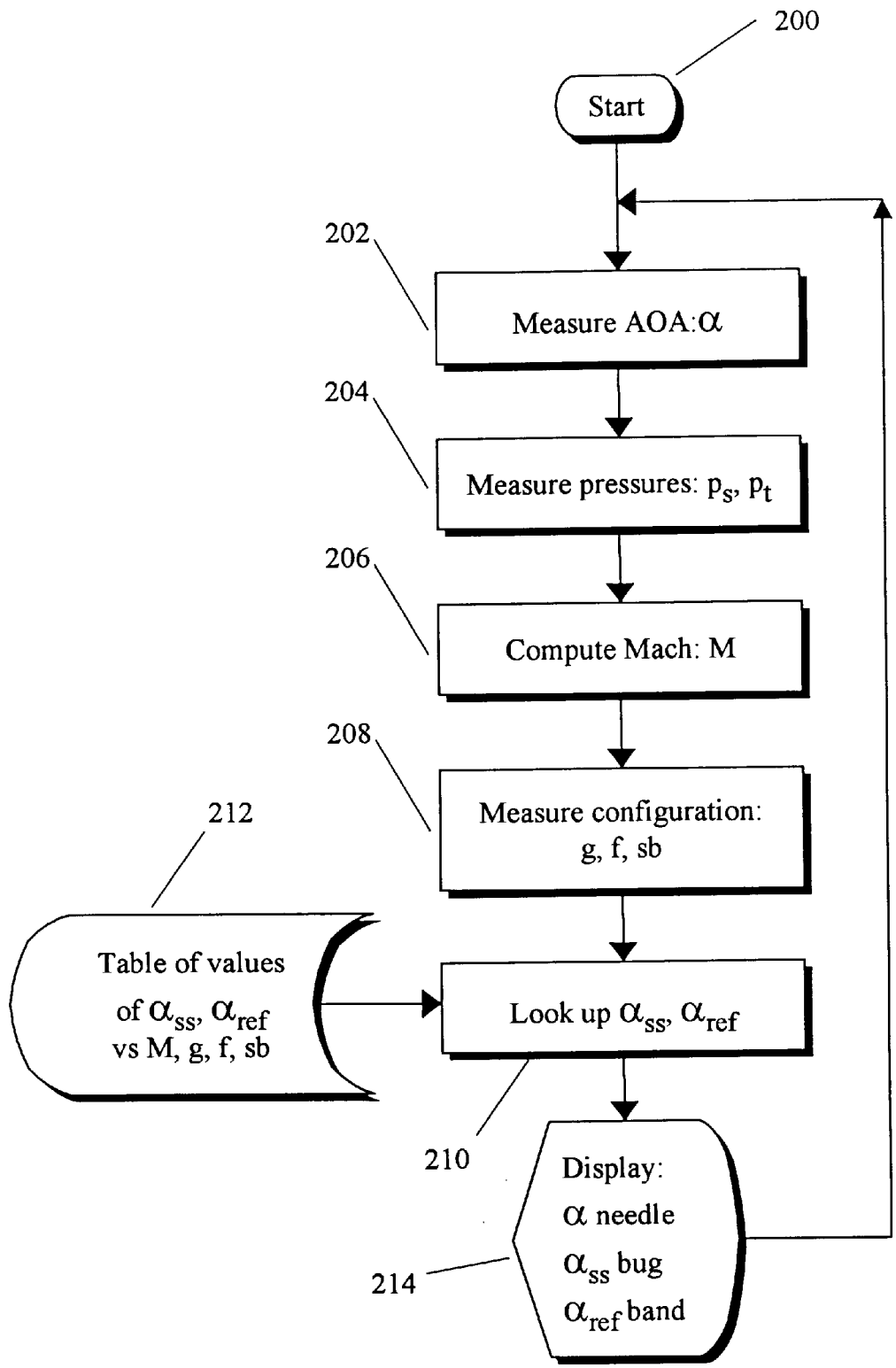
FIG. 6 is a logic flow diagram depicting the sequence of logical steps followed by the preferred embodiment of the inventive non-normalized angle-of-attack indicating system.

Positioned on one side of the gauge 40 is a needle or pointer 42 which, in a manner better understood with respect to FIGS. 5 and 6, is moveable along the gauge to indicate the aircraft's actual angle-of-attack.

Positioned with respect to the gauge 40 on the side opposite of the pointer 42 are first and second moveable bugs 44, 46, respectively. First moveable bug 44 may be positioned to indicate an upper limit angle-of-attack value, such as stick shaker, whereas the second moveable bug 46 is positionable to indicate a reference value of aircraft angle-of-attack. Note that the second bug 46 is shown as indicating a range of angle-of-attack values, because again there is more than one acceptable value of angle-of-attack for the approach condition.

The angle-of-attack indicating system of FIG. 3b also includes a digital readout 48 of the aircraft's actual angle-of-attack.

The primary advantage of the present apparatus and method for displaying aircraft angle-of-attack is that it is far less sensitive to errors in air data or aircraft configuration sensing than prior art displays.

FIGS. 4a and 4b depict the inventive non-normalized display indicating 4.5° angle-of-attack at two different Mach numbers. In FIG. 4a, the stick shaker bug 50 is shown at its low-Mach position of 11° angle-of-attack. In FIG. 4b, the stick shaker bug 52 is shown in its high-Mach (M=0.75) position of 6° angle-of-attack, as it might be after an air data failure on approach (at low Mach number) causes an over-estimation of Mach number.

It is clear from a comparison of the prior art normalized indicating system of FIG. 2b and the inventive, non-normalized indicating system in FIG. 4b that the proposed non-normalized indicator is more useful in cases of air data failure. First, the explicit movement of the upper-limit bug provides some evidence for the existence of an air data failure. Second, when the flight crew recognizes this condition, they can monitor the position of the pointer on the gauge while ignoring the position of the upper-limit bug. An additional benefit of the proposed display is that it is easier to understand under normal conditions, since it shows angle-of-attack in raw form.

In fact, the indicating system depicted in FIG. 3a has been evaluated against a prototypical normalized display known to the prior art. The inventive non-normalized display was found to be superior to the normalized display for providing pilots with general situational awareness, and particularly for flying approaches without air speed or other air data information.

FIG. 5 is a schematic, block diagram illustrating the preferred embodiment of the present non-normalized aircraft angle-of-attack indicating system, here indicated generally at 60. An angle-of-attack (AOA) vane 62 sends raw angle-of-attack data, α', over a line 64, to an air data computer 66.

A pitot-static system 68 monitors and sends both a static pressure signal, $P_s$, over a line 70 to the air data computer and a total pressure signal, $P_t$, over a line 72, to the air data computer 66.

The air data computer 66, in the normal manner, sends an aircraft's actual angle-of-attack signal α over a line 74 to a display computer 76.

In addition, in the normal manner the air data computer 66 generates an aircraft Mach value, M, which is transmitted over a line 78 to the display computer 76. A series of configuration sensors, indicated generally at 80, on the aircraft communicate several relevant configuration variables to the display computer 76 such as, for example, aircraft landing gear position, over line 82, aircraft flap position, over line 84 and aircraft speed brake position, over line 86.

The display computer 76 uses the received Mach number, gear position value, flap position value and speed brake position value to look up in a lookup table (in the preferred embodiment), or calculate in an alternate embodiment, the appropriate limit value for angle-of-attack, α. Thus, for an angle-of-attack stick shaker value, the display computer, out of its sub-block 90 looks up, (or calculates) an appropriate angle-of-attack stick shaker signal level $\alpha_{ss}$.

In addition, in a sub-block 92, the display computer inputs aircraft gear position, flap position and speed brake position to generate a second angle-of-attack reference bug, $\alpha_{ref}$, which may correspond to, for example, the aircraft zero-lift angle-of-attack. The signals α, over line 94, $\alpha_{ss}$, over line 96 and $\alpha_{ref}$ over line 98 are all fed to the angle-of-attack indicator, 100. The angle-of-attack indicator, in the normal manner, includes drivers to receive the various signals and deflect a pointer 102 with respect to a scaled gauge 104. In addition, a moveable first bug 106 indicates the angle-of-attack stick shaker value, $\alpha_{ss}$, while a second bug 108, indicates the second angle-of-attack reference level, $\alpha_{ref}$.

In addition, the display computer 76 or the angle-of-attack indicator 100 may sense the rates of change of the signal α (at 74 or 94) and make a suitable adjustment to its values (perhaps by adding its rate of change multiplied by a predetermined constant to its value) so that it is quickened, i.e. displayed at a position which it hasn't yet attained, but it will attain some short interval in the future. Such a quickening scheme gives the human operator more time to respond in conditions of rapidly changing angle-of-attack.

FIG. 6 is a logic flow diagram illustrating the sequential steps implemented by the preferred embodiment of the aircraft non-normalized angle-of-attack indicating system. Here, the system starts at 200 and enters a first block 202 at which angle-of-attack, α, is measured.

Then, the system in block 204 measures static pressure, $P_s$ and total pressure $P_t$. The system then increments to block 206 in which a Mach value, M, is computed from $P_s$ and $P_t$. Next, at block 208, measurements are taken of aircraft configuration, such as landing gear position, g, flap position, f, and speed brake position, sb.

The system then increments to block 210 where, based upon the input values of α, $p_s$, $p_t$, M, g, f, and sb, the system uses a lookup table, block 212, to look up the limit values for angle-of-attack, such as stick shaker, $\alpha_{ss}$ and approach reference angle-of-attack, indicated as $\alpha_{ref}$.

Finally, out of block 210 a step 214 is entered in which appropriate signals are fed to the display to drive the pointer with respect to the gauge to indicate angle-of-attack, and position the first bug $\alpha_{ss}$ and position the second bug $\alpha_{ref}$. The system then returns to block 202 to repeat the afore-described process.

In summary, an improved aircraft angle-of-attack indicating system has been described in detail. Whereas a preferred embodiment has been set forth, it should be understood that many variations and modifications thereto are possible without varying from the true spirit and scope of the present invention.

What is claimed is:

1. An aircraft non-normalized angle-of-attack indicating system comprising:
    a gauge having fixed position markings to indicate a predetermined range of aircraft angle-of-attack;
    a pointer which is predeterminedly positioning with respect to said gauge for indicating angle-of-attack;
    pointer driver means for determining the aircraft's actual angle-of-attack and positioning said pointer in response thereto;
    a first bug which is moveable with respect to said gauge markings to define a first limit condition for aircraft angle-of-attack;
    bug driver means for determining said aircraft first limit position and positioning said first bug in response thereto;
    a second bug which is moveable with respect to said gauge markings to define a reference condition for aircraft angle-of-attack; and
    wherein said bug driver includes means for determining said aircraft angle-of-attack reference position and positioning said second bug in response thereto.

2. The indicating system of claim 1 wherein said pointer driver means includes means for sensing rate of change in aircraft angle-of-attack and quickening the positioning of said pointer in response thereto.

3. The indicating system of claim 1 wherein:
    said first bug is indicative of aircraft stick shaker; and
    said bug driver includes means to determine aircraft stick shaker and position said first bug to indicate same.

4. The indicating system of claim 3 wherein:
    said second bug is indicative of aircraft approach reference angle-of-attack, and
    said bug driver includes means to determine aircraft approach reference angle-of-attack and position said second bug to indicate same.

5. The indicating system of claim 4 wherein said pointer driver means includes means for sensing rate of change in aircraft angle-of-attack and quickening the positioning of said pointer in response thereto.

6. The indicating system of claim 3 wherein said pointer driver means includes means for sensing rate of change in aircraft angle-of-attack and quickening the positioning of said pointer in response thereto.

7. The indicating system of claim 1 wherein:
    said gauge is arcuate having fixed, equal arc spaced markings of angle-of-attack from a predetermined minimum to a predetermined maximum angle-of-attack value;
    said pointer is arcuately positioinable with respect to one side of said gauge; and
    said first bug is arcuately moveable with respect to a second side of said gauge.

8. The indicating system of claim 1 wherein:
    said gauge is linear having fixed markings of angle-of-attack from a predetermined minimum to a predetermined maximum angle-of-attack value;
    said pointer is linearly positionable with respect to one side of said gauge; and
    said first and second bugs are linearly moveable with respect to a second side of said gauge.

9. A method for displaying aircraft non-normalized angle-of-attack comprising the steps of:
   a) providing a gauge including fixed position markings to indicate a predetermined range of aircraft angle-of-attack;
   b) providing a pointer which is predeterminedly positioned with respect to the gauge for indicating angle-of-attack;
   c) driving said pointer by means of a pointer driver for determining the aircraft's actual angle-of-attack and positioning the pointer in response thereto;
   d) moving a first bug with respect to the gauge markings to define a first limit condition for aircraft angle-of-attack;
   e) determining the aircraft's first limit position and positioning said first bug in response thereto;
   f) moving a second bug with respect to the gauge markings to define a second limit condition for aircraft angle-of-attack; and
   g) determining the aircraft's second limit position and positioning the second bug in response thereto.

10. The method of claim 9 including the further step of sensing the rate of change in aircraft angle-of-attack and quickening the position of the pointer in response thereto.

11. The method of claim 9 including the further steps of:
   providing the first bug as indicative of aircraft stick shaker angle-of-attack; and
   determining aircraft stick shaker angle-of-attack and positioning said first bug to indicate same.

12. The method of claim 11 including the further steps of:
   providing said second bug as indicative of aircraft approach reference angle-of-attack; and
   determining aircraft approach reference angle-of-attack and positioning the second bug to indicate same.

13. The method of claim 12 including the further step of sensing rate of change in aircraft angle-of-attack and quickening the positioning of the pointer in response thereto.

14. The method of claim 11 including the further step of sensing rate of change in aircraft angle-of-attack and quickening the positioning of said pointer in response thereto.

15. The method of claim 9 including the further steps of:
   providing the gauge as arcuate having fixed markings of angle-of-attack from a predetermined minimum to a predetermined maximum angle-of-attack value;
   positioning said pointer arcuately with respect to one side of said gauge; and
   moving said first and second bugs arcuately with respect to the second side of the gauge.

16. The method of claim 9 including the further steps of:
   providing said gauge as linear having said fixed markings of angle-of-attack from a predetermined minimum to a predetermined maximum angle-of-attack value;
   positioning said pointer with respect to one side of said gauge; and
   moving said first bug with respect to a second side of said gauge.

* * * * *